US008479292B1

(12) United States Patent
Linhardt (10) Patent No.: US 8,479,292 B1
(45) Date of Patent: Jul. 2, 2013

(54) DISABLING MALWARE THAT INFECTS BOOT DRIVERS

(75) Inventor: Peter Linhardt, Malibu, CA (US)

(73) Assignee: Symantec Corporation, Mountain View, CA (US)

( * ) Notice: Subject to any disclaimer, the term of this patent is extended or adjusted under 35 U.S.C. 154(b) by 179 days.

(21) Appl. No.: 12/950,785

(22) Filed: Nov. 19, 2010

(51) Int. Cl.
*G06F 11/00* (2006.01)
*G06F 11/14* (2006.01)
*G06F 11/36* (2006.01)
*G06F 12/16* (2006.01)
*G06F 15/177* (2006.01)
*H04L 29/06* (2006.01)
*G06F 21/54* (2013.01)
*G06F 21/57* (2013.01)

(52) U.S. Cl.
CPC ........ *H04L 63/1441* (2013.01); *H04L 63/1466* (2013.01); *G06F 21/54* (2013.01); *G06F 21/57* (2013.01)
USPC ...................... 726/23; 713/1; 713/2; 713/164

(58) Field of Classification Search
USPC ................... 713/1, 2, 164–167, 188; 726/22, 726/23, 24, 25; 717/126, 127, 129
See application file for complete search history.

(56) References Cited

U.S. PATENT DOCUMENTS

| 5,353,411 | A  | * | 10/1994 | Nakaosa et al. ................... 713/1 |
| 6,175,904 | B1 | * | 1/2001  | Gunderson .................... 711/162 |
| 6,678,734 | B1 | * | 1/2004  | Haatainen et al. ............ 709/230 |
| 6,851,057 | B1 | * | 2/2005  | Nachenberg ..................... 726/24 |
| 7,143,275 | B2 | * | 11/2006 | Cepulis et al. .................... 713/1 |
| 7,234,167 | B2 | * | 6/2007  | Teblyashkin et al. ........... 726/24 |
| 7,334,263 | B2 | * | 2/2008  | Szor ................................ 726/22 |
| 7,424,398 | B2 | * | 9/2008  | Booth et al. ................... 702/186 |
| 7,769,992 | B2 | * | 8/2010  | Wang ................................ 713/2 |
| 7,921,461 | B1 | * | 4/2011  | Golchikov et al. ............. 726/23 |
| 2004/0025042 | A1 | * | 2/2004 | Kouznetsov et al. ......... 713/200 |
| 2004/0034764 | A1 | * | 2/2004 | Bulusu et al. ..................... 713/1 |
| 2004/0103299 | A1 | * | 5/2004 | Zimmer et al. ............... 713/200 |
| 2004/0168070 | A1 | * | 8/2004 | Szor ............................... 713/188 |

(Continued)

FOREIGN PATENT DOCUMENTS

JP          2010218449 A * 9/2010

OTHER PUBLICATIONS

NNRD41997, "Backup Master Boot Record for Virus Recovery", Research Disclosure, vol. 42, issue No. 419, Mar. 1999, 2 pages.*

(Continued)

*Primary Examiner* — Andrew L Nalven
*Assistant Examiner* — Walter Malinowski
(74) *Attorney, Agent, or Firm* — Brill Law Office; Jeffrey Brill (57) ABSTRACT

A valid entry point for each boot driver running under an operating system is gleaned. When the operating system is rebooted, a security boot driver is loaded prior to loading other boot drivers. The security boot driver reads the actual entry points of each boot driver, before the boot drivers have run. The security boot driver compares the actual entry points to the corresponding valid entry points. Responsive to an actual entry point not matching its corresponding valid entry point, it is determined that the boot driver is infected. Infected boot drivers are corrected, by replacing their actual entry points with the corresponding, valid entry points. After infected boot drivers have been corrected, the infecting malicious code can be identified and disabled. Sections of boot drivers other than entry points can be gleaned, read and compared, up to entire boot drivers.

20 Claims, 4 Drawing Sheets

U.S. PATENT DOCUMENTS

| | | | |
|---|---|---|---|
| 2005/0039029 A1* | 2/2005 | Shipp | 713/188 |
| 2005/0144442 A1* | 6/2005 | Smith | 713/164 |
| 2005/0149713 A1* | 7/2005 | Rothman et al. | 713/1 |
| 2005/0223238 A1* | 10/2005 | Schmid et al. | 713/188 |
| 2006/0259909 A1* | 11/2006 | Passero et al. | 719/312 |
| 2007/0050611 A1* | 3/2007 | Weikel | 713/2 |
| 2007/0226478 A1* | 9/2007 | Rudelic | 713/1 |
| 2008/0005797 A1* | 1/2008 | Field et al. | 726/24 |
| 2008/0109495 A1* | 5/2008 | Herberger et al. | 707/204 |
| 2009/0172471 A1* | 7/2009 | Zimmer et al. | 714/17 |
| 2009/0187992 A1* | 7/2009 | Poston | 726/24 |
| 2009/0205045 A1* | 8/2009 | Horvath et al. | 726/23 |
| 2009/0217258 A1* | 8/2009 | Wenzinger et al. | 717/173 |
| 2009/0287915 A1* | 11/2009 | Gattegno et al. | 713/2 |
| 2009/0327367 A1* | 12/2009 | Mehra et al. | 707/205 |
| 2010/0175104 A1* | 7/2010 | Khalid | 726/1 |
| 2010/0293331 A1* | 11/2010 | Fujii et al. | 711/119 |
| 2011/0016205 A1* | 1/2011 | DeBettencourt et al. | 709/224 |
| 2011/0149161 A1* | 6/2011 | Milirud et al. | 348/571 |
| 2011/0191850 A1* | 8/2011 | Turbin | 726/24 |
| 2012/0117625 A1* | 5/2012 | Ray | 726/4 |

OTHER PUBLICATIONS

NNRD41993, "Secure Authentication for Remote Client Management", Research Disclosure, vol. 42, issue No. 419, Mar. 1999, 2 pages.*

Embleton, Shawn et al., "SMM Rootkits: A New Breed of OS Independent Malware", SecureComm '08 Proceedings of the 4th international conference on Security and privacy in communication networks, Association of Computing Machinery, 2008, 12 pages.*

Abdulmalik, Mohammed et al., "Windows Vista Kernel-Mode: Functions, Security Enhancements, and Flaws", Leonardo Journal of Sciences, issue 12, Jan.-Jun. 2008, pp. 99-110.*

Kumar, Eric, "Battle with the Unseen—Understanding Rootkits on Windows", AVAR 2008, Auckland, New Zealand, 20 pages.*

Vasudevan, Amit, "MalTRAK: Tracking and Eliminating Unknown Malware", 2008 Annual Computer Security Conference, 2008, pp. 311-321.*

\* cited by examiner

DISABLING MALWARE THAT INFECTS BOOT DRIVERS

TECHNICAL FIELD

This disclosure pertains generally to computer security, and more specifically to disabling malware that infects boot drivers.

BACKGROUND

A rootkit is software that enables continued privileged access to a computer, while actively hiding its presence. Once a rootkit is installed, it allows an attacker to mask the intrusion and to gain privileged access to the computer by circumventing normal authentication and authorization mechanisms. Although rootkits can be used for a variety of purposes, they are often used maliciously to make a bundled software payload undetectable by adding stealth capabilities.

Contemporary rootkits are capable of infecting boot drivers which can execute before an operating system becomes active, and thus before conventional antimalware countermeasures can be taken. Once the operating system has become active, an infected boot driver can load and execute additional malware (the so called "payload"). More specifically, some rootkits that attack boot drivers modify the resource section of a boot driver, changing the boot driver entry point to a small section of malicious code. When the infected boot driver loads, this section of malicious code executes and further loads additional malicious code, stored on hidden sectors, for example at the end of the partition. Thus, the boot driver is infected so as to execute just enough malicious code to load the malicious payload, which can subsequently execute undesirable functionality (e.g., misappropriating computing resources, logging key strokes or stealing passwords). Such an infected driver typically is not changed in any other way, and is otherwise fully functional in its original capacity.

Such malicious code can also subvert operating system services that conventional antimalware systems rely on to detect and repair infections. For example, the malware can intercept attempts to read from and/or write to the infected boot driver, and transparently divert the intercepted attempts to a clean copy of the driver stored elsewhere on the computer. Because of this spoofing, the infected boot driver typically cannot be detected by a conventional antimalware system. A secondary problem can occur when the malware infects a critical system component. In this case, even if the infection is detected, a clean copy of the component may not be available to replace the infected one.

For a conventional antimalware system to address malware that infects boot drivers, it is necessary to perform a "clean-boot" from another medium such as a stand-alone DVD-ROM system. The clean boot method for malware repair is time consuming, inconvenient to the user, and requires possession and handling of the additional medium. Also, clean versions of infected files must be acquired from another source such as the operating system distribution medium.

It would be desirable to address these issues.

SUMMARY

A boot driver security management system detects and corrects infected boot drivers. A valid entry point for each of a plurality of boot drivers running under an operating system is gleaned. This gleaning can be done, for example, by reading an operating system component such as the registry to obtain an inventory of boot drivers running under the operating system, and then reading a valid entry point for each boot driver from a corresponding image on disk. This results in gleaning the valid entry points even for infected boot drivers, because if a boot driver has been infected by malicious code, attempts to access the infected boot driver are diverted by the malicious code to a clean copy from which the valid entry point is gleaned. The gleaned valid entry points of the boot drivers are stored, for example in the registry.

When the operating system is rebooted, a security boot driver is loaded prior to the loading of any other boot driver. The security boot driver reads the actual entry points of each boot driver, before the boot drivers have run. Even if a boot driver is infected, the security boot driver accesses the infected boot driver and reads its actual entry point. This works because attempts to access the infected boot driver by the security boot driver are not diverted to the clean copy, as the associated malicious code to perform the diversion of the access attempts has not executed. The security boot driver compares the actual entry points of the boot drivers to the corresponding stored valid entry points. Responsive to an actual entry point of a boot driver not matching its corresponding valid entry point, the security boot driver detects that the boot driver is infected. The security boot driver corrects any detected infected boot drivers, by replacing their actual entry points with the corresponding, stored valid entry points, before the infected boot drivers run. After the detected infected boot drivers have been corrected, the malicious code that did the infecting can be identified and disabled. This malicious code can comprise, for example, a root kit and corresponding malicious code configured to divert attempts to access infected boot drivers.

In some embodiments, at least one valid section of each boot driver of the plurality is gleaned and stored in addition to the valid entry point. This can comprise any section up to and including the entire boot driver. In such embodiments, corresponding actual additional sections of each boot driver are read by the security boot driver, and compared to the stored additional sections. Responsive to an actual additional section of a boot driver not matching the corresponding valid additional section, the security boot driver detects that the boot driver is infected, and corrects the infected boot driver by replacing the actual additional section with the corresponding valid additional section, before the boot driver runs.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
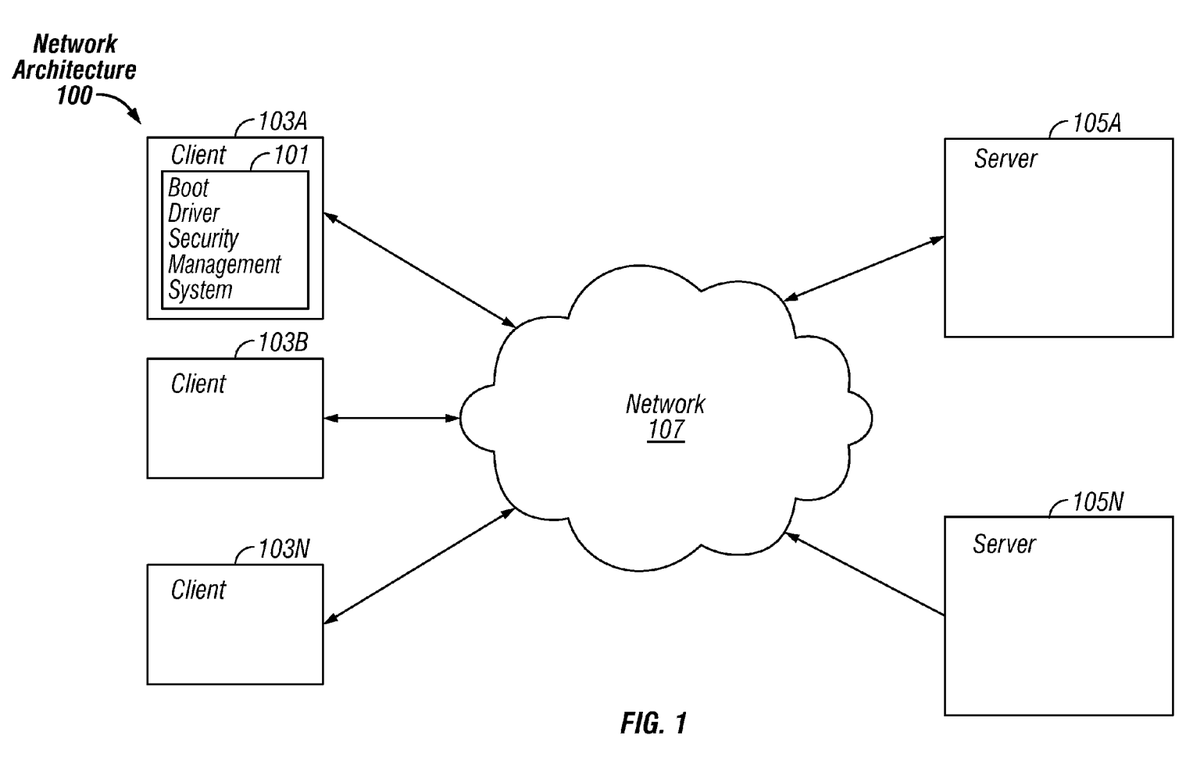
FIG. 1 is a block diagram of an exemplary network architecture in which a boot driver security management system can be implemented, according to some embodiments.

FIG. 1 is a block diagram illustrating an exemplary network architecture 100 in which a boot driver security management system 101 can be implemented. The illustrated network architecture 100 comprises multiple clients 103A, 103B and 103N, as well as multiple servers 105A and 105N. In FIG. 1, the boot driver security management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
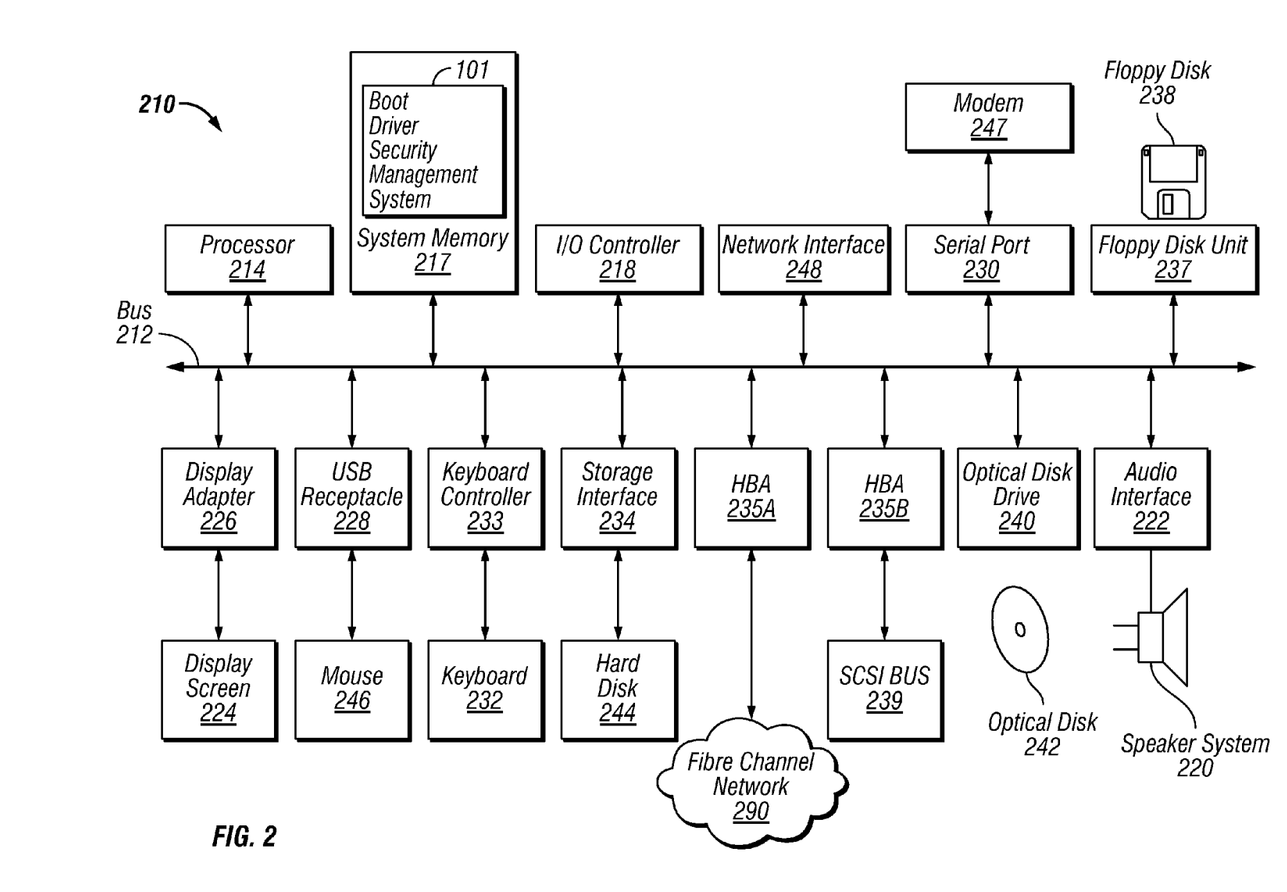
FIG. 2 is a block diagram of a computer system suitable for implementing a boot driver security management system, according to some embodiments.

FIG. 2 is a block diagram of a computer system 210 suitable for implementing a boot driver security management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the boot driver security management system 101 is illustrated as residing in system memory 217. The workings of the boot driver security management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
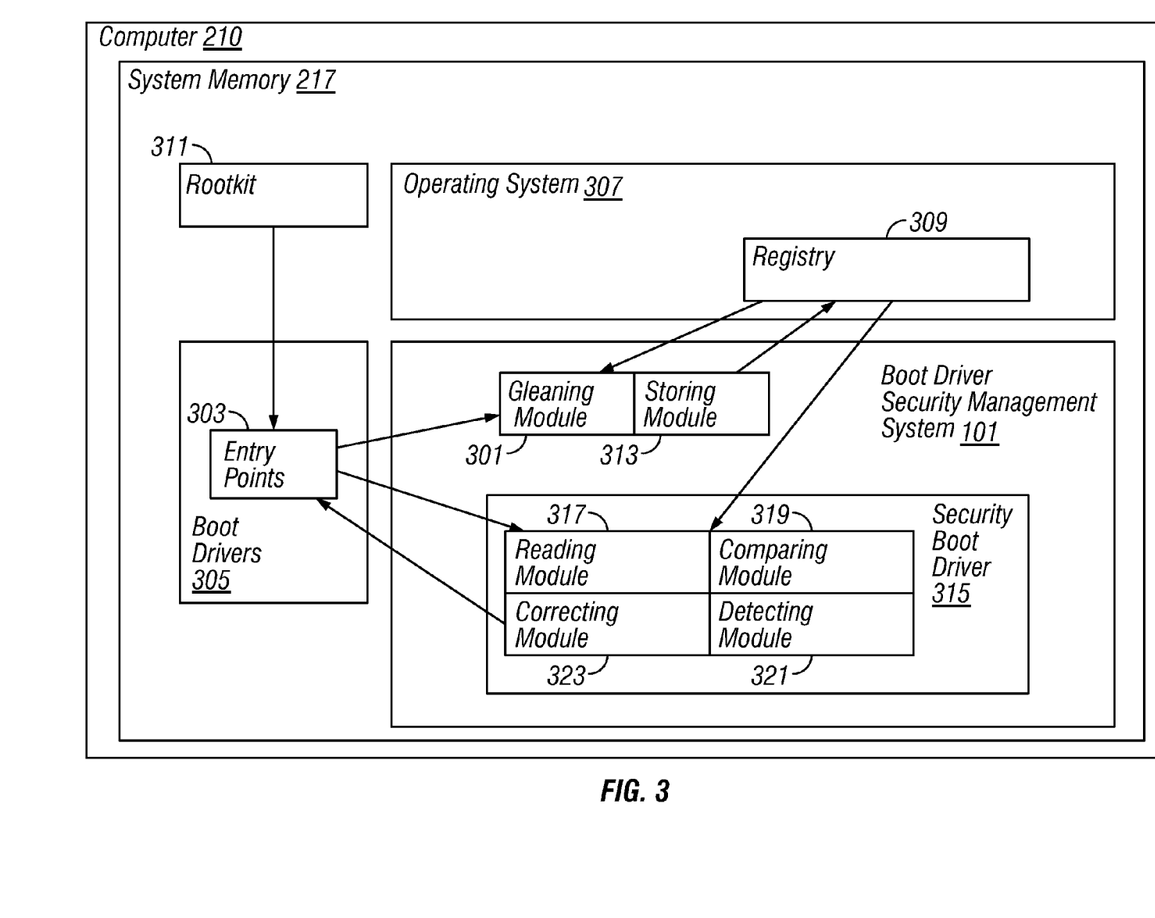
FIG. 3 is a block diagram of the operation of a boot driver security management system, according to some embodiments.

FIG. 3 illustrates the operation of a boot driver security management system 101 residing in the system memory 217 of a computer 210, according to some embodiments. As described above, the functionalities of the boot driver security management system 101 can reside on a client 103, a server 105, or be distributed between multiple computer systems 210, including within a cloud-based computing environment in which the functionality of the boot driver security management system 101 is provided as a service over a network 107. It is to be understood that although the boot driver security management system 101 is illustrated in FIG. 3 as a single entity, the illustrated boot driver security management system 101 represents a collection of functionalities, which can be instantiated as a single or multiple modules as desired (an instantiation of specific, multiple modules of the boot driver security management system 101 is illustrated in FIG. 3). It is to be understood that the modules of the boot driver security management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the boot driver security management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an entry point gleaning module 301 of the boot driver security management system 101 gleans the valid entry points 303 of all of the boot drivers 305 running under an operating system 307 on a computer 210. Under current versions of Microsoft Windows®, the entry point gleaning module 301 can acquire this information by reading the appropriate sections of the registry 309 to obtain an inventory of boot drivers 305 present on the system, and then extracting (e.g., reading) the valid entry points 303 of the boot drivers 305 from their images on disk 244 (or other medium). Under other operating systems 307, different operating system components (not illustrated) can store the listing and location information concerning boot drivers 305, in which case the entry point gleaning module 301 can read the appropriate operating system components to obtain this information.

For any boot driver 305 not infected by a rootkit 311 (or similar malicious code), the entry point gleaning module 301 gleans its valid entry point 303, as the entry points 303 of uninfected boot drivers 305 have not been modified. In addition, even if the computer 210 on which the entry points 303 of the boot drivers 305 are being gleaned has been infected by a rootkit 311 that has modified the entry point 303 of one or more boot drivers 305, the entry point gleaning module 301 still gleans the valid entry points 303 as opposed to the corrupted ones, because of the spoofing performed by the rootkit 311. In other words, if a boot driver 305 has had its entry point 303 replaced with malicious code that loads a malicious payload, that malicious payload will intercept and divert attempts to access the boot driver 305, including attempts to read its entry point 303, to an uncorrupted copy, which contains the valid entry point 303. Thus, even if a boot driver 305 has been infected, the entry point gleaning module 301 still gleans its valid entry point 303. Once the valid entry points 303 of all of the boot drivers 305 have been gleaned, an entry point storing module 313 of the boot driver security management system 101 stores the gleaned valid entry points 303, for example in the registry 309 as illustrated.

A special, security boot driver 315 of the boot driver security management system 101 is configured to run before all other boot drivers 305. Thus, at the start of the process when the operating system 307 reboots, this security boot driver 315 is the first boot driver 305 to load. An entry point reading module 317 of the security boot driver 315 accesses the entry points 303 of the other boot drivers 305 (which have not yet run) and reads their entry points 303. A comparing module 319 of the security boot driver 315 compares each accessed entry point 303 to the corresponding stored, valid entry point 303 for that boot driver 305. Note that the entry point reading module 317 accesses the entry points 303 of the boot drivers 305 before they have run. Therefore, if a boot driver 305 has been infected by a rootkit 311, the entry point reading module 317 reads the actual, corrupted entry point 303 of the infected boot driver 305 and not the spoofed entry point 303. This is so because the infected boot driver 305 has not yet executed, its malicious entry point code has not yet run, and hence the malicious payload that intercepts and diverts access attempts has not yet executed. In other words, even if any boot driver 305 has been infected, the code to spoof access attempts is not yet running, and therefore the entry point comparing module 319 compares the actual entry point 303 to the valid entry point 303. In response to an actual entry point 303 of a boot driver differing from its valid entry point 303, a detecting module 321 of the of the security boot driver 315 detects that the boot driver 305 has been infected.

In response to the detecting module 321 detecting an infected boot driver 305, an entry point correcting module 323 of the security boot driver 315 corrects the corrupted entry point 303, by modifying the boot driver 305 to replace the corrupted entry point 303 with the valid entry point 303. This effectively neuters the infection performed by the rootkit 311, because the entry point correcting module 323 fixes the corrupted entry point 303 before the boot driver 305 that had been infected runs. Therefore, when the boot driver 305 executes, the valid entry code runs, and the malicious payload is never executed. This prevents the executing of any malicious code or the corruption of any services prior to the completion of the booting of the operating system 307. Once the operating system 307 boots, because the operating system 307 and its services are no longer corrupted, any additional cleanup (e.g., the identification and disabling/deleting of the rootkit 311 itself and any of its components such as an unloaded malicious payload) can by performed by the boot driver security management system 101 or a conventional antimalware system.

In other embodiments, the boot driver security management system 101 also gleans, stores and checks for modifications in sections of the boot drivers 305 other than the entry points 303, up to, in some embodiments, the entire boot drivers 305. In such embodiments, the appropriate modules of the boot driver security management system 101 glean and store the sections of interest (or entire images where desired) of the boot drivers 305 under the running operating system 307. When the operating system 307 is next restarted, the security boot driver 315 then loads before the other boot drivers 305 as described above, the appropriate modules thereof check the sections of interest of the boot drivers 305 against the stored sections gleaned earlier, and any infections are detected and corrected using the procedures described above.

Figure 4:
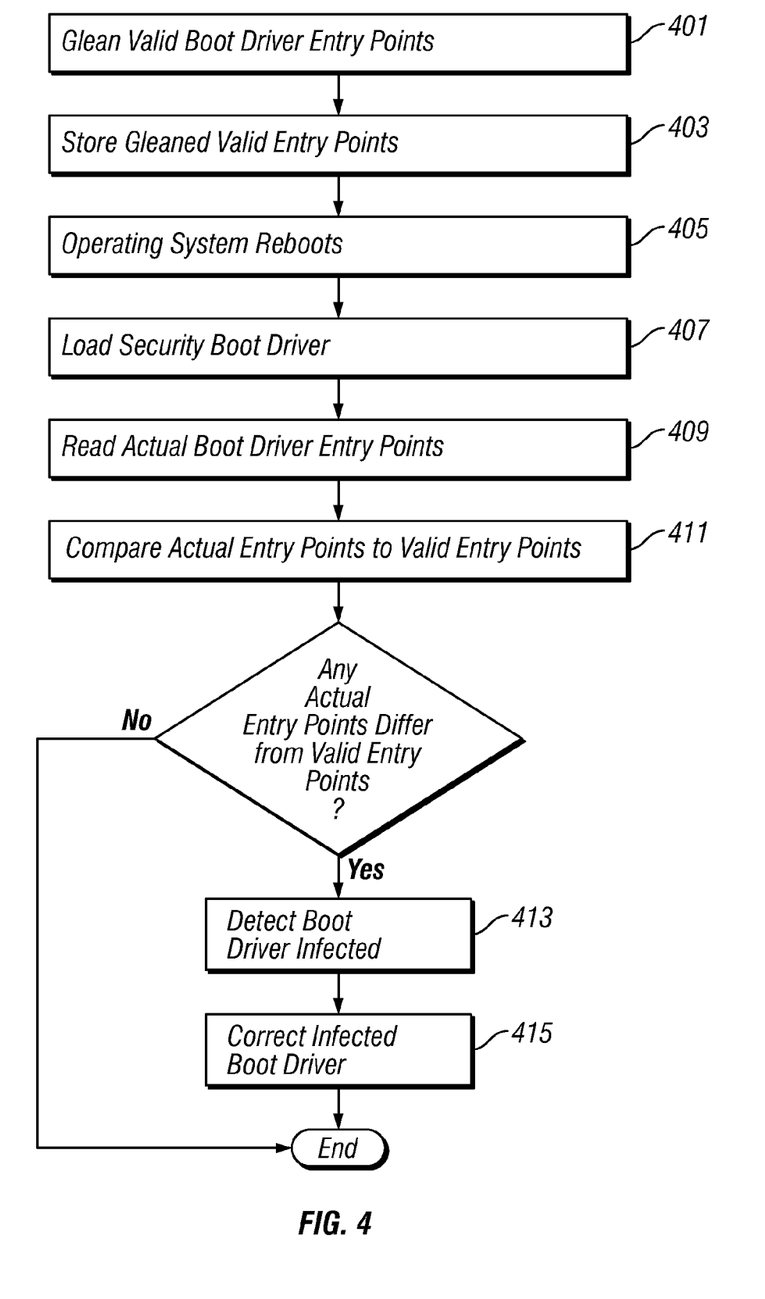
FIG. 4 is a flowchart of the operation of a boot driver security management system, according to some embodiments.

FIG. 4 illustrates steps of the operation of the boot driver security management system 101 (FIG. 1), according to some embodiments. The entry point gleaning module 301 (FIG. 3) of the boot driver security management system 101 (FIG. 1) gleans 401 the valid entry points 303 (FIG. 3) of all of the boot drivers 305 (FIG. 3) running under an operating system 307 (FIG. 3) on a computer 210 (FIG. 2). The entry point storing module 313 (FIG. 3) of the boot driver security management system 101 (FIG. 1) stores 403 the gleaned valid entry points 303 (FIG. 3). Subsequently, the operating system 307 (FIG. 3) running on the computer 210 (FIG. 2) reboots 405, and the security boot driver 315 (FIG. 3) of the boot driver security management system 101 (FIG. 1) loads 407 before any other boot driver 305 (FIG. 3). The entry point reading module 317 (FIG. 3) of the security boot driver 315 (FIG. 3) reads 409 the actual entry points 303 (FIG. 3) of the other boot drivers 305 (FIG. 3). The comparing module 319 (FIG. 3) of the security boot driver 315 (FIG. 3) compares 411 each actual entry point 303 (FIG. 3) to the corresponding stored, valid entry point 303 (FIG. 3) for that boot driver 305 (FIG. 3). In response to an actual entry point 303 (FIG. 3) of a boot driver 305 (FIG. 3) differing from its valid entry point 303 (FIG. 3), a detecting module 321 (FIG. 3) of the of the security boot driver 315 (FIG. 3) detects 413 that the boot driver 305 (FIG. 3) has been infected. In response to the detection of an infected boot driver 305 (FIG. 3), the entry point correcting module 323 (FIG. 3) of the security boot driver 315 (FIG. 3) corrects 415 the infected boot driver 305 (FIG. 3) by replacing its corrupted entry point 303 (FIG. 3) with the stored, valid entry point 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting and correcting infected boot drivers, the method comprising the steps of:
   gleaning, by a computer, a valid entry point for each of a plurality of boot drivers running under an operating system, after the operating system has booted;
   wherein at least one specific boot driver of the plurality has been infected by malicious code, such that attempts to access the at least one specific infected boot driver are diverted to at least one clean copy from which the at least one valid entry point of the at least one infected boot driver is gleaned;
   storing, by the computer, the gleaned valid entry points of each boot driver of the plurality;
   when the operating system is rebooted, loading, by the computer, a security boot driver prior to loading any of the boot drivers of the plurality;
   reading, by the security boot driver, actual entry points of each boot driver of the plurality, before the boot drivers of the plurality have run;
   wherein the security boot driver accesses the at least one infected boot driver and reads the at least one actual entry point, because attempts to access the at least one infected boot driver by the security boot driver are not diverted to the at least one clean copy, because associated malicious code to perform the diversion of the access attempts has not executed;
   comparing, by the security boot driver, the actual entry points of each boot driver of the plurality to the stored valid entry points of each boot driver of the plurality;
   responsive to the at least one actual entry point of the at least one infected boot driver not matching the at least one valid entry point of the at least one infected boot driver, detecting that the at least one infected boot driver is infected, by the security boot driver; and
   correcting the detected at least one infected boot driver, by the security boot driver, by replacing the at least one actual entry point with the at least one valid entry point, before the at least one infected boot driver runs.

2. The method of claim 1 wherein gleaning, by the computer, the valid entry point for each of the plurality of boot drivers running under the operating system after the operating system has booted further comprises:
   reading, by the computer, an operating system component to obtain an inventory of boot drivers running under the operating system; and
   reading, by the computer, a valid entry point for each boot driver running under the operating system from a corresponding image on disk.

3. The method of claim 1 further comprising:
   after correcting the detected at least one infected boot driver, identifying, by the computer, the malicious code that infected the at least one infected boot driver; and
   disabling, by the computer, the identified malicious code.

4. The method of claim 3 wherein the malicious code further comprises:
   at least a root kit configured to infect at least one boot driver.

5. The method of claim 3 wherein the malicious code further comprises:
   at least malicious code configured to divert attempts to access at least one infected boot driver.

6. The method of claim 1 further comprising:
   gleaning, by the computer, at least one valid section of each boot driver of the plurality in addition to the valid entry point;
   storing, by the computer, the gleaned at least one valid additional section of each boot driver of the plurality;
   reading, by the security boot driver, actual at least one additional sections of each boot driver of the plurality, before the boot drivers of the plurality have run;
   comparing, by the security boot driver, the at least one actual additional section of each boot driver of the plurality to the stored at least one valid additional section of each boot driver of the plurality;
   responsive to the at least one actual additional section of the at least one infected boot driver not matching the at least one valid additional section of the at least one infected boot driver, detecting that the at least one infected boot driver is infected, by the security boot driver; and
   correcting the detected at least one infected boot driver, by the security boot driver, by replacing the at least one actual additional section with the at least one valid additional section, before the at least one infected boot driver runs.

7. The method of claim 6 wherein the at least one additional section of each boot driver further comprises:
   the entire boot driver.

8. At least one non-transitory computer readable storage medium storing a computer program product for detecting and correcting infected boot drivers, the computer program product comprising:
   program code for gleaning a valid entry point for each of a plurality of boot drivers running under an operating system, after the operating system has booted;
   wherein at least one specific boot driver of the plurality has been infected by malicious code, such that attempts to access the at least one specific infected boot driver are diverted to at least one clean copy from which the at least one valid entry point of the at least one infected boot driver is gleaned;
   program code for storing the gleaned valid entry points of each boot driver of the plurality;
   program code for, when the operating system is rebooted, loading a security boot driver prior to loading any of the boot drivers of the plurality;
   program code for reading, by the security boot driver, actual entry points of each boot driver of the plurality, before the boot drivers of the plurality have run;
   wherein the security boot driver accesses the at least one infected boot driver and reads the at least one actual entry point, because attempts to access the at least one infected boot driver by the security boot driver are not diverted to the at least one clean copy, because associated malicious code to perform the diversion of the access attempts has not executed;
   program code for comparing, by the security boot driver, the actual entry points of each boot driver of the plurality to the stored valid entry points of each boot driver of the plurality;

program code for, responsive to the at least one actual entry point of the at least one infected boot driver not matching the at least one valid entry point of the at least one infected boot driver, detecting that the at least one infected boot driver is infected, by the security boot driver; and program code for correcting the detected at least one infected boot driver, by the security boot driver, by replacing the at least one actual entry point with the at least one valid entry point, before the at least one infected boot driver runs.

9. The computer program product of claim 8 wherein the program code for gleaning the valid entry point for each of the plurality of boot drivers running under the operating system after the operating system has booted further comprises:

program code for reading an operating system component to obtain an inventory of boot drivers running under the operating system; and program code for reading a valid entry point for each boot driver running under the operating system from a corresponding image on disk.

10. The computer program product of claim 8 further comprising:

program code for, after correcting the detected at least one infected boot driver, identifying the malicious code that infected the at least one infected boot driver; and program code for disabling the identified malicious code.

11. The computer program product of claim 10 wherein the malicious code further comprises:

at least a root kit configured to infect at least one boot driver.

12. The computer program product of claim 10 wherein the malicious code further comprises:

at least malicious code configured to divert attempts to access at least one infected boot driver.

13. The computer program product of claim 8 further comprising:

program code for gleaning at least one valid section of each boot driver of the plurality in addition to the valid entry point;

program code for storing the gleaned at least one valid additional section of each boot driver of the plurality;

program code for reading, by the security boot driver, actual at least one additional sections of each boot driver of the plurality, before the boot drivers of the plurality have run;

program code for comparing, by the security boot driver, the at least one actual additional section of each boot driver of the plurality to the stored at least one valid additional section of each boot driver of the plurality;

program code for, responsive to the at least one actual additional section of the at least one infected boot driver not matching the at least one valid additional section of the at least one infected boot driver, detecting that the at least one infected boot driver is infected, by the security boot driver; and program code for correcting the detected at least one infected boot driver, by the security boot driver, by replacing the at least one actual additional section with the at least one valid additional section, before the at least one infected boot driver runs.

14. The computer program product of claim 13 wherein the at least one additional section of each boot driver further comprises:

the entire boot driver.

15. A computer system for detecting and correcting infected boot drivers, the computer system comprising:

a processor;

system memory;

a gleaning module running in the system memory, the gleaning module being configured for gleaning a valid entry point for each of a plurality of boot drivers running under an operating system, after the operating system has booted;

wherein at least one specific boot driver of the plurality has been infected by malicious code, such that attempts to access the at least one specific infected boot driver are diverted to at least one clean copy;

a storing module running in the system memory, the storing module being configured for storing the gleaned valid entry points of each boot driver of the plurality;

a security boot driver configured for being loaded into the system memory when the operating system is rebooted, prior to loading any of the boot drivers of the plurality;

a reading module of the security boot driver, the reading module being configured for reading actual entry points of each boot driver of the plurality, before the boot drivers of the plurality have run;

wherein the reading module of the security boot driver is further configured to access the at least one infected boot driver and to read the at least one actual entry point, because attempts to access the at least one infected boot driver by the security boot driver are not diverted to the at least one clean copy, because associated malicious code to perform the diversion of the access attempts has not executed;

a comparing module of the security boot driver, the comparing module being configured for comparing the actual entry points of each boot driver of the plurality to the stored valid entry points of each boot driver of the plurality;

a detecting module of the security boot driver, the detecting module being configured for, responsive to the at least one actual entry point of the at least one infected boot driver not matching the at least one valid entry point of the at least one infected boot driver, detecting that the at least one infected boot driver is infected; and a correcting module of the security boot driver, the correcting module being configured for correcting the detected at least one infected boot driver by replacing the at least one actual entry point with the at least one valid entry point, before the at least one infected boot driver runs.

16. The computer system of claim 15 wherein the gleaning module is further configured for gleaning a valid entry point for each of a plurality of boot drivers running under an operating system by:

reading an operating system component to obtain an inventory of boot drivers running under the operating system; and reading a valid entry point for each boot driver running under the operating system from a corresponding image on disk.

17. The computer system of claim 15 further comprising:

a malicious code identifying module running in the system memory, the malicious code identifying module being configured for identifying the malicious code that infected the at least one infected boot driver, after the detected at least one infected boot driver has been corrected; and a malicious code disabling module running in the system memory, the malicious code disabling module being configured for disabling the identified malicious code.

18. The computer system of claim 17 wherein the malicious code further comprises:

at least a root kit configured to infect at least one boot driver.

19. The computer system of claim 15 wherein:

the gleaning module is further configured for gleaning at least one valid section of each boot driver of the plurality in addition to the valid entry point;

the storing module is further configured for storing the gleaned at least one valid additional section of each boot driver of the plurality;

the reading module is further configured for reading actual at least one additional sections of each boot driver of the plurality, before the boot drivers of the plurality have run;

the comparing module is further configured for comparing the at least one actual additional section of each boot driver of the plurality to the stored at least one valid additional section of each boot driver of the plurality;

the detecting module is further configured for detecting, responsive to the at least one actual additional section of the at least one infected boot driver not matching the at least one valid additional section of the at least one infected boot driver, that the at least one infected boot driver is infected; and the correcting module is further configured for correcting the detected at least one infected boot driver by replacing the at least one actual additional section with the at least one valid additional section, before the at least one infected boot driver runs.

20. The computer system of claim 19 wherein the at least one additional section of each boot driver further comprises: the entire boot driver.

\* \* \* \* \*